United States Patent [19]
Lutz

[11] 3,777,179
[45] Dec. 4, 1973

[54] VOLTAGE-DIVIDING DC CIRCUIT BREAKER AND METHOD

[75] Inventor: Michael A. Lutz, Los Angeles, Calif.

[73] Assignee: Hughes Aircraft Company, Culver City, Calif.

[22] Filed: Oct. 16, 1972

[21] Appl. No.: 298,042

[52] U.S. Cl. .............................. 307/136, 317/11 R
[51] Int. Cl. .......................................... H01h 33/00
[58] Field of Search ................... 307/136; 317/11 R, 317/11 A, 11 C, 11 E

[56] References Cited
UNITED STATES PATENTS
3,383,519   5/1968   Colclaser, Jr. et al. ............ 317/11 R Primary Examiner—Herman J. Hohauser
Attorney—W. H. MacAllister, Jr. et al.

[57] ABSTRACT

The voltage dividing DC circuit breaker comprises serially connected high voltage and low voltage switches to carry load current. Serial capacitors are connected in parallel thereto and a crossed field switching device is connected in parallel to the low voltage switch. When the low voltage and high voltage switches are opened, current is forced through the crossed field switching device. When the crossed field switching device is turned off, the arcing high voltage switch is forced below its chopping current. The open circuit voltage is divided across the capacitors.

8 Claims, 4 Drawing Figures

PATENTED DEC 4 1973　　　　　　　　　　　　　　　3,777,179

VOLTAGE-DIVIDING DC CIRCUIT BREAKER AND METHOD

BACKGROUND

1. Field of the Invention

This invention is directed to a voltage dividing DC circuit breaker, and the method of operating the breaker.

2. The Prior Art

The prior art includes patents such as K. T. Lian and W. F. Long U.S. Pat. No. 3,641,358, which uses an off-switching device which requires the full voltage holdoff capability corresponding to the open-circuit voltage plus over-voltages. This is also true of M. A. Lutz and W. F. Long, U.S. Pat. No. 3,660,723, as well as K. T. Lian re-issue U.S. Pat. No. Re27,557 (re-issue of U.S. Pat. No. 3,534,226). Thus, the prior structures require a full voltage circuit interrupter to interrupt the line voltage. It has been conceived that a plurality of such interrupters could be connected in series to achieve the required voltage rating. However, a series of such devices can raise other problems. For example, when turning off a plurality of serially connected devices, they must be turned off in appropriate relationship to each other, or an unequal voltage division results which can cause destruction. Even onswitching of such serially connected devices can be difficult if the devices in the circuit are not appropriately designed.

SUMMARY

In order to aid in the understanding of this invention, it can be stated in essentially summary form that it is directed to a voltage dividing DC circuit breaker and method. The DC circuit breaker includes serially connected high and low voltage switches which carry the load current. Serially connected first and second capacitors are connected in parallel to the switches. A crossed field switching device is connected in parallel to the low voltage switch and second capacitor. Thus, when the low voltage switch is opened, the current is forced through the crossed field switching device. The high voltage switch is opened and conducts current by arcing. When the crossed field switching device is off-switched, current in the open and arcing high voltage switch is driven below its chopping value and voltage across the open switches rises in accordance with the series capacitor values. The method comprises operating the voltage dividing DC circuit breaker in that manner.

Accordingly, it is an object of this invention to provide a voltage dividing DC circuit breaker and method, such that voltage is divided across switches therein when the circuit breaker is made non-conducting. It is another object to provide a voltage dividing DC circuit breaker wherein low voltage components can be employed to perform the major switching functions. It is another object to divide voltage across serially connected switches in accordance with capacitive division.

Other objects and advantages of this invention will become apparent from a study of the following portion of the specification, the claims and the attached drawings.

DESCRIPTION

Figure 1:
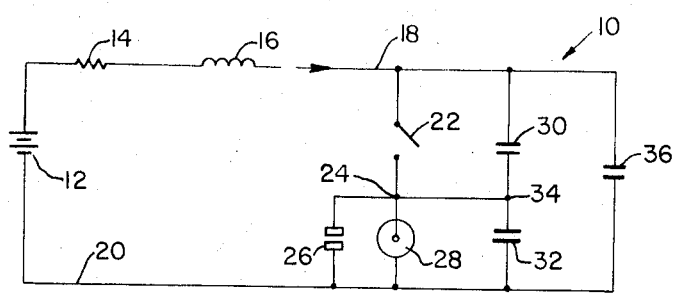
FIG. 1 is a schematic electrical circuit diagram of the voltage dividing DC circuit breaker in accordance with this invention.

FIG. 1 illustrates the voltage dividing DC circuit breaker 10 of this invention at the right-hand end of the schematic circuitry of FIG. 1. The left end of the schematic circuitry illustrates a power supply 12 and an electric load represented by resistance 14 and inductance 16. Power supply 12 is serially connected with the load through circuit breaker 10, so that when circuit breaker is opened current flow through the load is cut off. A generation and distribution circuit, including a load, is shown in more detail in M. A. Lutz and W. F. Long U.S. Pat. No. 3,660,723, and the power supply, distribution and load are represented in more detail in that patent. Power supply 12 is a high voltage power supply, with voltage levels such that it is difficult to off-switch current against such a high voltage with present-day commercial equipment. In terms of equipment presently available, in experimental usage, circuit breaker 10 is capable of offswitching in circuits which have a supply voltage above 100 kv. The same equipment is capable of handling current of 1000 amps or higher.

Buses 18 and 20 form the two terminals of circuit breaker 10. Switch 22 is connected to bus 18 and to an intermediate bus at junction 24. Switch 26 is connected between junction 24 and bus 20. When both switches 22 and 26 are closed, power supply 12 supplies current through the load, through the closed switches and through the buses. When it is desired that load current be offswitched, these switches are opened.

Switch 22 is a switch which is capable of continuously carrying the line current, such as a commercially available interrupter. A suitable vacuum interrupter is shown in T. H. Lee et al patent 3,411,038. The Lee structure is preferably furnished with electrodes of refractory metal, to provide a high chopping current value. Switch 26 is a switch which is capable of carrying full load current and is capable of opening and producing a sufficiently high arc voltage to drive the circuit current into the cross field switch device 28 which is connected in parallel thereto. Thus, switch 26 can be a standard $SF_6$ filled circuit breaker or can be a switch as described in Noel E. Reed patent application Ser. No. 255,665.

Crossed field switch device 28 is connected between junction 24 and bus 20. It is a device which is capable of carrying the full load current, but need only carry the current for a short time. Furthermore, while it must offswitch against the load current, it need not carry the full open circuit voltage of power supply 12 or the overvoltage offswitching transients. Suitable offswitching devices are shown in K. T. Lian U.S. Pat. No. 3,534,226, and R. C. Knechtli U.S. Pat. No. 3,638,061 and G. A. G. Hofmann and R. C. Knecktli U.S. Pat. No. 3,558,960. Other related crossed field offswitching devices are also useful in this service.

Capacitors 30 and 32 are serially connected between buses 18 and 20, and the junction 34 therebetween is connected through the intermediate bus to the junction 24. Capacitor 36 is connected across buses 18 and 20.

Figure 2:
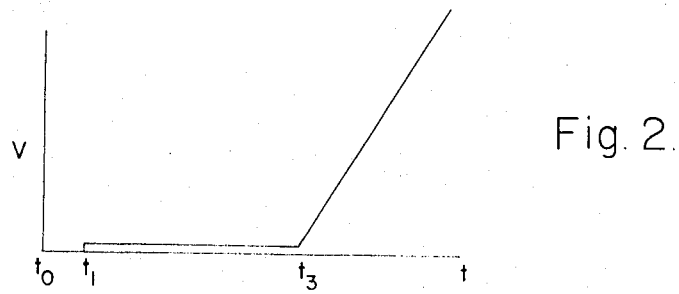
FIG. 2 is a graph of voltage versus time showing the voltage rise across the high voltage switch in the series-connected switches of this breaker.
Figure 3:
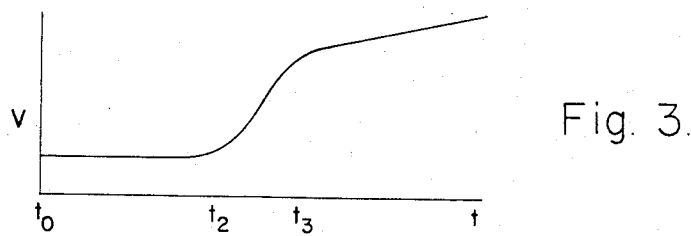
FIG. 3 is a graph showing the voltage versus time across the crossed field offswitching device in the circuit breaker of this invention.

The method of operation of the voltage dividing DC circuit breaker 10 is as follows. Assume that power supply 12 is supplying 1000 amps DC, and the load has a voltage drop of 100 kv. In normal operation the switches 22 and 26 are closed so that all of the load current passes therethrough and there is not substantial voltage drop thereacross. When it becomes desirable to offswitch the current through the load, switch 26 is opened. The voltage drop caused by arcing of open switch 26 causes transfer of current through crossed field switch 28, at time $t_0$ in FIGS. 2 and 3. This permits the deionization of open switch 26, with the voltage drop represented in FIG. 3 being the normal conducting voltage drop of crossed field switch device 28. The voltage drop in such a case is on the order of 500 v. Switch 22 is opened at time $t_1$, preferably at the same time as switch 26 is opened, and the arc voltage drop thereacross is represented from $t_1$ to $t_3$ in FIG. 2. To decrease the total offswitching interval, both switches 22 and 26 can be opened at the same time. Next, crossed field switch 28 starts to offswitch at time $t_2$ with reduction in current flow through the series connection of switches 22 and 28. Previously, switch 26 is opened and deionized. As the voltage drop rises across crossed field switch 28 as it ceases conduction, the current therethrough is reduced. When the current through switch 22 is decreased to the chopping current value at time $t_3$, then the voltage drop increases across now nonconducting switch 22. The voltage rise beyond the time $t_3$, in FIGS. 2 and 3, is controlled by the value of capacitors 30, 32 and 36, and the difference in slope between the rising voltages is determined by the ratio of the capacitors 30 and 32. Typically, the chopping current of a vacuum relay with refractory metal contacts positioned as switch 22, is 10 amps in a switch capable of carrying 1000 amps. The charging of capacitor 32 through arcing switch 22 must be sufficiently low that the current through switch 22 can go below the chopping current level. When an acceptable voltage rise of 1 kv per microsecond is desired, capacitor 36 can be $10^{-6}$ farads in value. To achieve a voltage division of approximately ten to one (i.e., the maximum voltage across switch 22 is ten times that across 26), we require capacitor 32 to be ten times the size of capacitor 30. To insure that the charging current of capacitor 32 is less than the chopping current of switch 22, the size of capacitor 32 must be limited in size to $10^{-8}$ F (in this example). Finally, the value of capacitor 30 must exceed the stray capacitance of switch 22 to be effective. Conservative choices of capacitors 30 and 32 would be $10^{-9}$ F and $10^{-8}$ F, respectively. Thus, the voltage on the breaker when current has stopped flowing, comprises 90 kv between bus 18 and the intermediate bus at junction 24, and 10 kv between junction 24 and bus 20. For this reason, the switch 26, the crossed field switching device 28 and the larger capacitor 32 can be designed to hold off smaller voltages than the maximum system voltages. With these values switch 22 is a high voltage switch while switch 26 is a low voltage switch.

Figure 4:
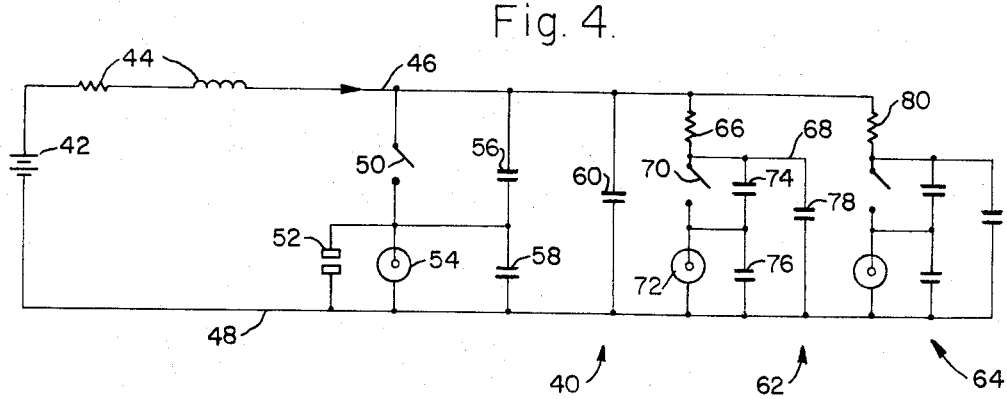
FIG. 4 is a schematic electric circuit diagram of the voltage dividing DC circuit breaker of this invention showing it as incorporating multiple stages for successive impedance increase.

Referring to FIG. 4, the circuit breaker 40 shown therein is connected the same as circuit breaker 10. It is connected to a power supply 42 and serially through a load 44 comprised of a resistor and an inductor. Circuit breaker 40 has buses 46 and 48 between which are serially connected switches 50 and 52. Crossed field switch device 54 is connected in parallel to switch 52 while serially connected capacitors 56 and 58 are connected across buses 46 and 48, and in parallel to switches 50 and 52. These components are the same as the components of circuit breaker 10, wih the same examples of actual construction and ratings. However, in order to prevent an offswitching operation to cause too high a line voltage pulse, due to inductive or capacitive characteristics of the line, circuit breaker resistive branches 62 and 64 are provided.

Circuit breaker branch 62 comprises a power resistor 66 connected to bus 46 and to intermediate bus 68. Intermediate bus 68 is connected through a series connection of switch 70 and crossed field switch device 72. These switches are paralleled by a series connection of capacitors 74 and 76, which are connected on their other end to bus 48. The intermediate connection between the capacitors 74 and 76 is connected between switches 70 and 72. Additionally, capacitor 78 is connected between bus 68 and bus 48. Switches 70 and 72 correspond to switches 50 and 54 in character, and are preferably of the same nature. Now, when the first section of circuit breaker 40 containing switches 50, 52 and 54 is turned off, current is driven through power dissipating resistor 66, closed switch 70 and conducting crossed field switch 72. When switch 70 is opened and crossed field switch 72 is made non-conducting, the voltage division thereacross is divided in accordance with the value of capacitors 74 and 76. These are chosen in the same ratio as capacitors 56 and 58. Capacitor 78 again smooths voltage surges due to offswitching.

Another branch 64 serves as an additional offswitching stage so that further power can be absorbed in resistor 80 as offswitching proceeds. In this way, sequential offswitching results in power absorption in the resistors, together with reduction in line current. This example of the voltage dividing DC circuit breaker illustrated in FIG. 4 shows the manner in which a sequential circuit breaker can employ the voltage dividing circuitry and equipment. Thus, it can be employe in a sequential circuit breaker as illustrated in K. T. Lian U.S. Pat. No. 3,534,226 or in a circuit breaker of the type described in K. T. Lian and W. F. Long U.S. Pat. No. 3,641,358. Similarly, it can be employed in a practical circuit breaker of the type described in the U.S. Pat. No. 3,657,607 by W. Knauer. Thus, by employment of this circuit, voltage dividing can take place and the crossed field switch device need not carry the full circuit voltage.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A voltage dividing DC circuit breaker for breaking a circuit against line voltage and having circuit breaking components of insufficient capability for withstanding open circuit line voltage comprising:

first and second buses in said circuit breaker;

first and second serially connected switches connected between said buses and connected to an intermediate bus therebetween;

an electronic switch capable of offswitching all the current through said circuit breaker against voltage build up less than the open circuit voltage connected in parallel to said second switch between said intermediate and second buses; and first and second serially connected capacitors connected to said first and second buses and at their intermediate point connected to said intermediate bus, so thatin normal conduction current flows through said circuit breaker through said first and second switches in the closed condition, and when said first and second switches are opened, said first switch arcs and said second switch forces the circuit current through said electronic switch, and when said electronic switch is offswitched, current through said first switch decreases so that its arc extinguishes and current builds up with the standoff voltage divided between said first bus, and said intermediate bus and said second bus in accordance with the capacities of first and second capacitors.

2. The voltage dividing DC circuit breaker of cliam 1 wherein said electronic switch is a crossed field switch device.

3. The voltage dividing DC circuit breaker of claim 2 wherein said second capacitor has greater capacity than sad first capacitor.

4. The voltage dividing DC circuit breaker of claim 1 further including a resistive circuit breaker branch comprising:

a serial connection between said first and second buses comprised of a first resistor, and a third switch and a second electronic switch and a series connection of third and fourth capacitors connected in parallel to said third switch and said second electronic switch so that when said first and second switches are opened and said first electronic switch is turned off, current passes from said first bus to said second bus through said first resistor, said third switch and said second electronic switch to absorb energy in said first resistor and when said third switch is opened and said second electronic switch is turned off, voltage thereacross is divided in accordance with the capacity of said third and fourth capacitors.

5. The voltage dividing DC circuit breaker of claim 4 wherein said electronic switch is a crossed field switch device.

6. The voltage dividing DC circuit breaker of cliam 4 further including a second resistive breaker branch connected between said first and second buses, said second resitive circuit breaker branch having the same type of components as said first circuit breaker branch.

7. The voltage dividing DC circuit breaker of claim 6 wherein the electronic switch in said second resistive circuit breaker branch is a crossed field switch device.

8. The method of offswitching DC current flowing from a first bus to a second bus and where first and second serially connected switches are connected between the first and second buses and to an intermediate bus therebetween, with an electronic switch connected between the intermediate bus and the second bus, and with serially connected capacitors connected between the first and second buses and to the intermediate bus, comprising the steps of:

permitting conduction through closed first and second switches for current flow from the first to the second bus;

opening the second switch to force current flow through the electronic switch so that the second switch ceases conduction;

opening the first switch so that it continues conduction of the circuit current through arcing;

turning off the electronic switch so that the current through the first switch is reduced sufficiently low so that arcing of the first switch deionizes; and dividing the voltage rise across said first switch and said electronic switch resulting from cessation of conduction through said first switch and said electronic switch in accordance with the series capacitors connected in parallel thereto.

* * * * *